Patented Aug. 12, 1947

2,425,584

UNITED STATES PATENT OFFICE 2,425,584

CONDITIONING SULPHURIC ACID SLUDGE

Edward F. Wadley and Joseph T. Horeczy, Baytown, Tex., assignors to Standard Oil Development Company, a corporation of Delaware No Drawing. Application April 26, 1945, Serial No. 590,502

3 Claims. (Cl. 260—683.4)

The present invention is directed to the conditioning of sulfuric acid sludge or sulfuric acid discarded as spent in the treatment of hydrocarbons and is directed particularly to the treatment of sulfuric acid sludge obtained in the alkylation of olefins with isoparaffins when using relatively concentrated sulfuric acid as as alkylation catalyst.

The alkylation of olefins with isoparaffins in the presence of sulfuric acid as catalyst is a well-known commercial process. It is usually desirable to conduct such operations at approximately 30° to 50° F. and to use as the catalyst sulfuric acid having a concentration no lower than 89%. The spent acid or acid sludge typically withdrawn from such operations and discarded as unsuitable for further use as alkylation catalyst usually has a concentration of 87% acid although it may be within the range of 85% to 95% acid. This spent acid may, of course, be sent to an acid regenerating plant for purification and reconcentration and the purified acid returned from the regenerating plant to the alkylation system.

The above brief description of an alkylation process now practiced commercially gives the conditions now considered optimum with respect to the charging stock and the desired product but is not intended to be a detailed description of such alkylation processes. A more complete description of a conventional alkylation process will be found, for example, in Stahly et al., 2,322,482, June 22, 1943. It may be stated that the acid usually discarded as spent and unsuitable for further use as catalyst in an alkylation system, may have a concentration ranging from 85% to 90% acid. This spent acid contains water of the order of 1% or 2% and carbonaceous material of the order of 5% to 15%. This material is quite different from 85% to 90% sulfuric acid as the term is generally accepted because the acid discarded as spent from an alkylation system contains water on the order of 1% or 2%, whereas, conventional 85% to 90% acid contains from 10% to 15% water.

The spent acids of high carbonaceous content of the character discarded as spent from alkylation processes are found to heat spontaneously prior to the solidification thereof. The phenomenon of heating spontaneously includes a rapid increase in temperature from an initial temperature of the order of atmospheric temperature to temperatures in the range of 230° to 300° F. and this spontaneous temperature rise results in the solidification of the spent acid.

The commercial alkylation process usually operates continuously with spent sulfuric acid withdrawn continuously or intermittently, the spent acid sent to a regenerating system where it is regenerated and purified, if possible, and the purified acid returned to the alkylation system. A process for concentrating spent acid, particularly an acid having a high carbonaceous content such as is present in the acid withdrawn as spent from an alkylation system, is disclosed in patent application Serial No. 475,905, filed February 15, 1943, in the name of Frank A. Ferguson. In commercial operations, the alkylation units and the sulfuric acid regeneration units are rarely so synchronized as to allow the acid withdrawn as spent from the alkylation system to be sent immediately to the acid regeneration system but instead it is usual to send the spent acid to a storage tank and to withdraw the spent acid from the storage tank to the acid regeneration system as capacity is available therein. Prior to the present invention, the spent acid from an alkylation system sometimes solidified as it was being held in a storage tank prior to its regeneration and when this occurred it was necessary to remove the solidified acid sludge from the tank by mechanical means, as by the use of workmen employing shovels and buckets, and the solidified sulfuric acid sludge, a waste product, was discarded.

It is an object of the present invention to treat an acid sludge or spent acid having a relatively high carbonaceous content and a relatively low water content, to prevent the solidification of the acid sludge while it is being held in storage.

More specifically, it is an object of the present invention to treat the acid having a relatively high carbonaceous content and low water content withdrawn as spent and unsuitable for further catalytic use from an alkylation process immediately after it is discarded from an alkylation process in order to condition it to eliminate solidification thereof when, subsequently, it is held in storage prior to being sent to a regeneration system.

In accordance with the present invention, a contaminated sulfuric acid of the character discarded from alkylation processes as spent catalyst is conditioned prior to being sent to storage for further handling by being retained within a critical temperature range an interval of time greater than a critical minimum period. This conditioning operation allows the sulfuric acid to be subsequently stored an indefinite interval of time without danger of the solidification of the spent acid by spontaneous heating thereof.

The conditioning step to which the spent sulfuric acid is subjected to prevent the solidification thereof involves the maintenance of the sulfuric acid at a temperature within the range of 100° to 120° F. for an interval of time no less than 5 hours. The interval of time over which the spent sulfuric acid is maintained at this critical temperature range is not restricted to a predetermined maximum but for economic reasons it is usually undesirable to control the temperature of spent sulfuric acid within this critical range for more than 20 hours. When spent sulfuric acid having a carbonaceous content within the range of 5% to 15%, a water content of the order of 1% or 2% and the balance sulfuric acid is subjected to a conditioning treatment involving the retention of the spent acid at a temperature within the range of 100° to 120° F. for an interval of at least five hours, the conditioned acid may then be subjected to handling and storage without danger of spontaneous heating to such a temperature as to cause solidification of the acid.

The practice of the present invention will be further illustrated by the following examples. These examples are to be understood as given for illustrative purposes only and are not to be construed as limiting the invention in any way.

Example 1

A sample of spent sulfuric acid contained 10% carbonaceous material, approximately 1% water and the balance sulfuric acid. This sample was divided into two parts with a first part subjected to storage conditions simulating those which occur in plant practice and the second part conditioned in accordance with the present invention and then stored under conditions corresponding to those under which the first part was stored.

The first part of the sample was heated to a temperature of 120° F. and stored at this temperature under adiabatic conditions. The temperature of the material increased rapidly and continuously so that after five hours its temperature was 300° F. due to spontaneous generation of heat and the acid was entirely solidified.

The second part of the sample was conditioned by being maintained at a temperature within the range of 100° to 120° F. for 15 hours and the conditioned sample was then heated to a temperature of 120° F. and stored at this temperature under adiabatic conditions. When this part of the sample had been in storage 5 hours, the temperature was approximately 126° F.; after 24 hours the temperature had reached a maximum of 200° F. and thereafter gradually declined. The conditioned portion of the acid sample remained a liquid and could be readily handled after storage.

Example 2

A spent acid containing 5.8% carbon, approximately 1% water and the balance sulfuric acid was divided into two portions.

The first portion was heated to a temperature of 120° F. and stored at this temperature under adiabatic conditions. After the sample had been sent to storage, its temperature increased continuously due to the spontaneous generation of heat. After 22 hours of storage the temperature of the sample was 230° F. and the sample had solidified.

The second part of the sample was maintained at a temperature within the range of 100° to 120° F. for 12 hours and then sent to storage under adiabatic conditions at an initial temperature of 120° F. This conditioned sample reached a maximum temperature of 127° F. under adiabatic storage conditions and remained liquid.

Example 3

A sample of spent acid having a carbon content of 13.3%, a water content of 2% and a sulfuric acid content of 83.8% was divided into two parts.

The first part was heated to a temperature of 120° F. and stored under adiabatic conditions. The temperature rose rapidly and in 5 hours it had reached 250° F. and the sample had solidified.

The other part of the sample was held at a temperature in the range of 100° to 120° F. for 5 hours and was then sent to storage under adiabatic conditions with an initial temperature of 120° F., its temperature increased to a maximum of 175° F. after 11 hours of storage and then slowly decreased; this portion of the sample remained liquid due to the conditioning operation.

Having fully described and illustrated the practice of the present invention, what is desired to be claimed by Letters Patent is:

1. In a process wherein concentrated sulfuric acid is employed as the catalyst in an alkylation reaction and sulfuric acid containing substantial amounts of carbonaceous materials is withdrawn as spent catalyst from the process and sent to storage, the step of subjecting the sulfuric acid containing carbonaceous material to a temperature within the range of 100° to 120° F. for an interval of time no less than 5 hours immediately after it is withdrawn from the alkylation process.

2. A process for conditioning sulfuric acid sludge having a carbonaceous content within the range of 5% to 15% and a water content no greater than 2% of the type resulting from the alkylation of olefins with isoparaffins in the presence of sulfuric acid and having the property of solidifying on standing including the step of maintaining the sludge at a temperature within the range of 100° to 120° F. for not less than 5 hours.

3. In a chemical process including the alkylation of hydrocarbons in the presence of concentrated sulfuric acid as a catalyst, the withdrawal of sulfuric acid having a carbonaceous content within the range of 5% to 15% and a water content no greater than 2% as spent catalyst from the alkylation process, retaining the spent catalyst in storage an extended interval of time and subsequently withdrawing the spent catalyst from storage to an acid regeneration process, the step of conditioning the spent catalyst immediately after withdrawal from the alkylation process including the step of maintaining the spent catalyst at a temperature in the range of 100° to 120° F. for an interval of time not less than 5 hours.

EDWARD F. WADLEY.
JOSEPH T. HORECZY.

REFERENCES CITED

The following references are of record in the file of this patent:

UNITED STATES PATENTS

| Number | Name | Date |
|---|---|---|
| 2,343,791 | O'Dell | Mar. 7, 1944 |
| 2,666,933 | Gard | Jan. 5, 1937 |
| 1,983,678 | Rutherford | Dec. 11, 1934 |
| 2,267,458 | Goldsby | Dec. 23, 1941 |
| 2,111,920 | Wells | Mar. 22, 1938 |